United States Patent [19]

Wörner et al.

[11] Patent Number: 4,662,239
[45] Date of Patent: May 5, 1987

[54] DIVIDED FLYWHEEL

[75] Inventors: Günter Wörner, Kernen; Franz Moser, Wendlingen; Ernst Tscheplak, Weinstadt; Hermann Hausegger, Esslingen, all of Fed. Rep. of Germany

[73] Assignee: Daimler-Benz Aktiengesellschaft, Fed. Rep. of Germany

[21] Appl. No.: 764,648

[22] Filed: Aug. 12, 1985

[30] Foreign Application Priority Data

Aug. 18, 1984 [DE] Fed. Rep. of Germany ....... 3430457

[51] Int. Cl.⁴ .......................... F16F 15/12; F16D 3/14
[52] U.S. Cl. .................................. 74/574; 192/70.17; 192/106.2; 464/68
[58] Field of Search ............... 192/106.2, 106.1, 70.17; 464/68; 74/574

[56] References Cited

U.S. PATENT DOCUMENTS

| 3,817,362 | 6/1974 | Rist | 192/106.1 X |
| 3,863,747 | 2/1975 | Werner et al. | 192/106.2 |
| 3,931,876 | 1/1976 | Beeskow et al. | 192/106.2 |
| 4,000,794 | 1/1977 | Worner | 192/106.2 |
| 4,002,043 | 1/1977 | Yoshida | 464/67 |
| 4,036,341 | 7/1977 | Beeskow et al. | 192/106.2 |
| 4,044,874 | 8/1977 | Worner | 192/106.2 |
| 4,220,233 | 9/1980 | Ban et al. | 464/68 X |
| 4,468,207 | 8/1984 | Yoshida | 74/574 X |

Primary Examiner—Leslie Braun
Assistant Examiner—David A. Testardi
Attorney, Agent, or Firm—Barnes & Thornburg

[57] ABSTRACT

A divided flywheel for reducing vibrations transmitted from an engine to a power transmission line has an input and output part connected, respectively, to the engine and the transmission line. The input and output parts are coupled by coupling spring arrangement which allows for a degree of relative rotation of the parts. A plurality of attenuators (e.g., stop springs, friction linings, etc.) are arranged to take effect following selected predetermined angular displacements of the input and output parts. A preferred arrangement includes a connecting part, which is frictionally attached to one of the input and output parts and which engages the other of the parts following relative rotation by a first predetermined angular displacement, and a stop spring arrangement which is engaged following relative displacement of the parts by a second predetermined angular displacement.

9 Claims, 9 Drawing Figures

DIVIDED FLYWHEEL

SUMMARY AND BACKGROUND OF INVENTION

This invention relates to a divided flywheel for reducing the transmission of vibrations from an engine to a power transmission line. The flywheel has two coaxially arranged flywheel parts which are limitedly and mutually rotatable, one of which is drivingly connected to the engine and the other to the transmission line. A coupling spring arrangement is disposed between the flywheel parts and tends to return the parts from mutually rotated positions into a central position. An attenuation arrangement limits the amplitudes of resonant vibrations of the flywheel parts on the transmission line side. The masses of the flywheel parts and the relative rigidity of the coupling springs are designed such that the frequency of the resonant vibrations is lower than the frequency of the engine vibrations during operation above a threshold value of the engine speed.

A flywheel of this type is described in German Unexamined Patent Application No. 2,358,516. As soon as the engine speed exceeds the threshold value sufficiently, it becomes virtually impossible for any engine vibrations to be transmitted to the transmission line, because due to the interposed coupling spring means, the engine-side flywheel part cannot transmit the engine vibrations, or can transmit them only greatly attenuated, to the transmission line side flywheel part. In this so-called supercritical range, a vehicle is therefore characterized by extraordinarily quiet running and freedom from vibrations in the transmission line.

However, when starting the engine, passing through a speed range in which resonances occur cannot be avoided, so that the transmission line-side flywheel part may possibly vibrate with a substantially greater amplitude than the engine-side flywheel part. Such resonant vibrations must be suppressed by intense attenuation.

At the same time, however, it is noted that an intense attenuation is undesirable in the super-critical range, because this would result in the intensified transcoupling of engine vibrations to the transmission line.

Figure 6:
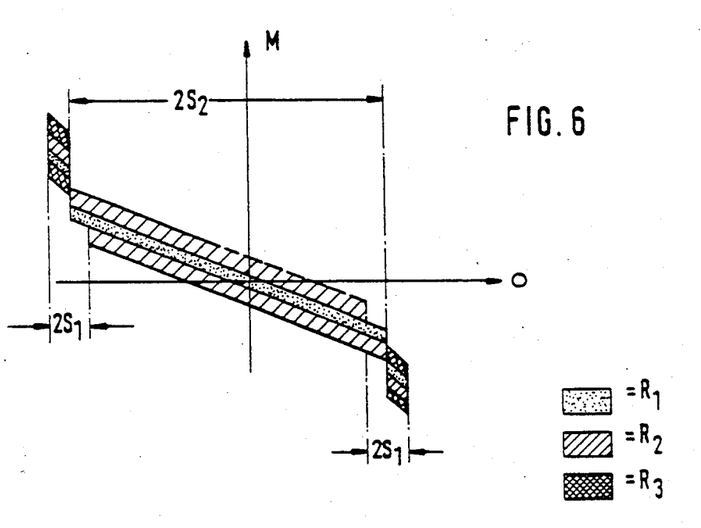

In German Patent Application No. 2,358,516 (see FIG. 6), an annular part is provided, resiliently and concentrically, on the transmission line-side flywheel part. The masses of the transmission line-side flywheel part and of the annular part, and the intensity of the spring means between these two parts are selected so that the above-mentioned resonant vibrations of the transmission line-side flywheel part are suppressed, because the annular part constitutes a dynamic attenuator.

The divided flywheel according to German Patent Application No. 2,358,516 accordingly constitutes, in principle, a three-part flywheel, the parts of which are mutually and resiliently connected. However, such a vibrating system with three vibrating masses is complicated to design and difficult to control. Furthermore, resonant vibrations may possibly be produced during operation in the supercritical range.

It is therefore an object of this invention to provide a divided flywheel which is characterized by its relatively simple design, and which operates in a relatively simple manner, while decoupling the transmission line from engine-side vibrations in the so-called supercritical range in a particularly efficacious manner.

These and other objects are attained in a divided flywheel which includes an input part connected to an output of an engine and a coaxial output part connected to the input of the power train or transmission line. The parts are coupled by a coupling spring arrangement disposed therebetween. A degree of relative rotation of the parts is allowed by this coupling arrangement. In a preferred embodiment, the assembly further includes a connecting part which is frictionally attached to one of the parts, and which engages the other of the respective parts following relative rotation of the parts through a first predetermined angular displacement. Following engagement, this arrangement offers resistance to further relative displacement of the parts. The preferred embodiment also includes a stop spring arrangement on one of the parts which engages a stop on the other of the parts following a further relative displacement through a second predetermined angular distance. For relative rotation in excess of the second predetermined displacement, a portion of the connecting part is clamped between the stop spring and the stop to further enhance the attenuation of vibrations.

The flywheel according to the present invention therefore has two flywheel parts which are mutually coupled in supercritical operation almost exclusively by the coupling spring means with low or virtually negligible attenuation. It is therefore virtually impossible for any vibrations to be transmitted from the engine to the transmission line.

Neither the connecting part nor the stop spring means take effect for the relatively low vibration amplitudes which occur in the supercritical operating range.

On the other hand, when passing through the resonant range of the vibrating system formed by the flywheel parts and the coupling spring means—when starting the engine, for example—greater amplitudes of vibration occur and the two flywheel parts are mutually displaced comparatively far. One flywheel part then initially moves the connecting part by virtue of a non-positive coupling, until its play relative to the other flywheel part is exhausted. In the event of further relative displacement of the parts, one part is moved against the resistance of the non-positive connection existing between the above-mentioned flywheel part and the connecting part, because the connecting part can no longer follow the movement of the one flywheel part due to the exhaustion of the play. The relative movements of the two flywheel parts are accordingly attenuated. Furthermore, in the case of further relative displacement of the flywheel parts, a stop spring means braced against one flywheel part and a stop arranged on the other flywheel part approach each other. Ultimately, the connecting part, or a part arranged thereon, becomes clamped between the stop spring means and the stop. Accordingly, for further relative displacement to occur, the flywheel parts must overcome the force of the stop spring means and the attenuation resistance caused by the non-positive connection between one flywheel part and the connecting part and the force of the coupling spring means. Excessive relative movement of the flywheel parts is therefore effectively limited, due to an intensified attenuation between the flywheel parts and to a change in the resonant frequency caused by cooperation of the stop spring means and the compling spring means from that which would exist if the coupling springs were used exclusively.

The clamping of the connecting part, or of a part attached to the connecting part, between the stop and the stop spring means further assures that the non-positive attenuation between one flywheel part and the connecting part is effective in both directions near the point of reversal of the relative movement of the flywheel parts. When the direction of relative movement between the flywheel parts reverses, the connecting part, or the part attached thereto, initially remains clamped between the stop and the stop spring means, so that—in spite of the above-mentioned play—the connecting part is unable to move relative to the other flywheel part. Consequently, the movements of the one flywheel part can occur only against the resistance of the non-positive connection between this flywheel part and the connecting part.

According to a preferred embodiment of the invention, the stop spring means may optionally be arranged asymmetrically and consequently take effect for a relatively slight displacement of the flywheel parts in one direction, but only for relatively large displacements of the flywheel parts in the other direction. In this case, an asymmetrical arrangement is generally employed such that when the vehicle or other machine accelerates, the flywheel parts tend to be relatively displaced in the direction in which the stop spring means takes effect only for relatively large displacement angles.

The play between the connecting part and one flywheel part is generally smaller than the play between the stop spring means on one flywheel part and the stop arrangement on the other. In this way it is ensured that the attenuation caused by the non-positive connection between the connecting part and one flywheel part, when the play between these parts is exhausted, takes effect before the stop spring means contacts the stop arrangement.

However, it is also possible for the play between the connecting part and the flywheel part to be approximately equal to the play between the stop arrangement and the stop spring means. By this means, the attenuation caused by the connecting part takes effect simultaneously with the effect of the stop spring means.

It is also possible to arrange two connecting parts, which are respectively coupled frictionally to the same flywheel part, but which have a different amount of play relative to the other flywheel part. In this case, the play of one connecting part may correspond to the play between the stop spring means and the stop arrangement, whereas the play of the other connecting part is smaller.

Lastly, the flywheel parts may also be coupled additionally by means of an attenuator arrangement which also incorporates play, and which takes effect only for larger relative displacements of the flywheel parts. If the attenuation force is sufficiently intense, such an arrangement may be used alternatively to the stop spring means to achieve a particularly simple design.

Other objects, advantages and novel features of the present invention will become apparent from the following detailed description of the invention when considered in conjunction with the accompanying drawings.

BRIEF DESCRIPTION OF THE DRAWINGS

FIGS. 7 to 9 show sectional illustrations of a flywheel according to the present invention, of which

DETAILED DESCRIPTION OF THE DRAWINGS

Figure 1:
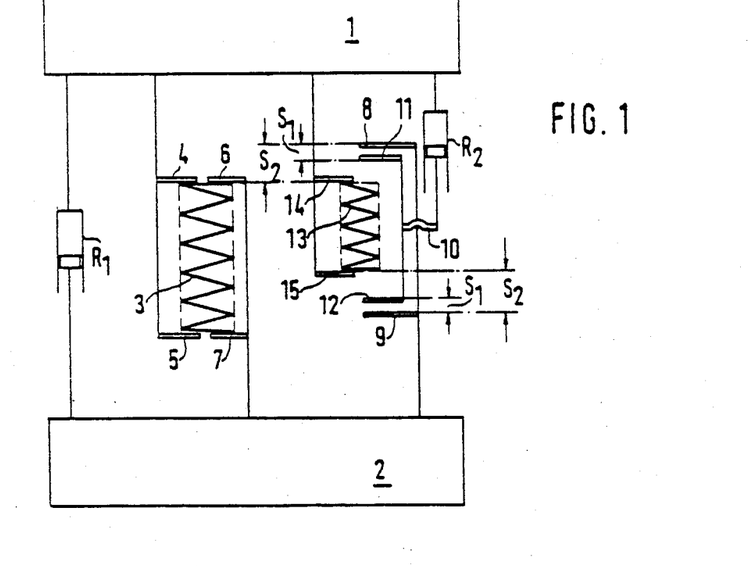
FIGS. 1 to 3 show diagrammatic illustrations of various divided flywheels according to the present invention.
Figure 2:
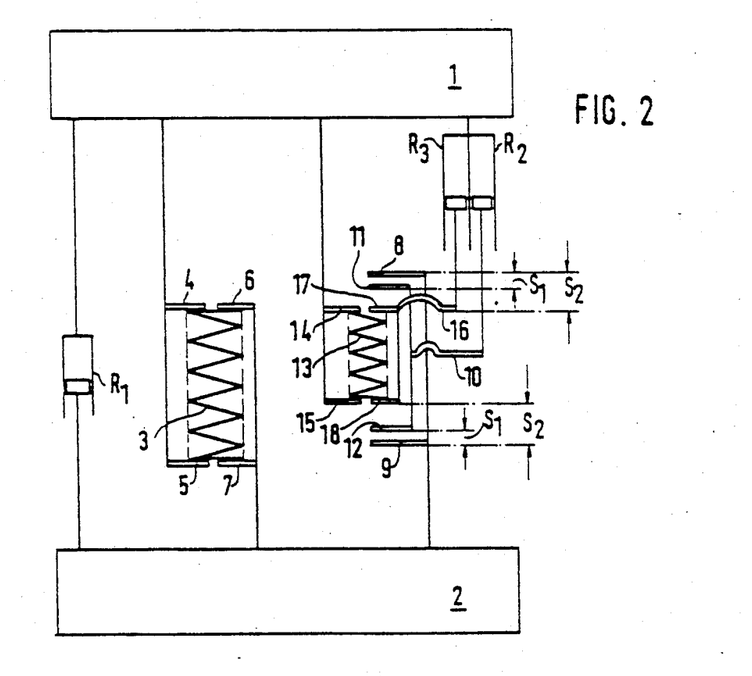
Figure 3:
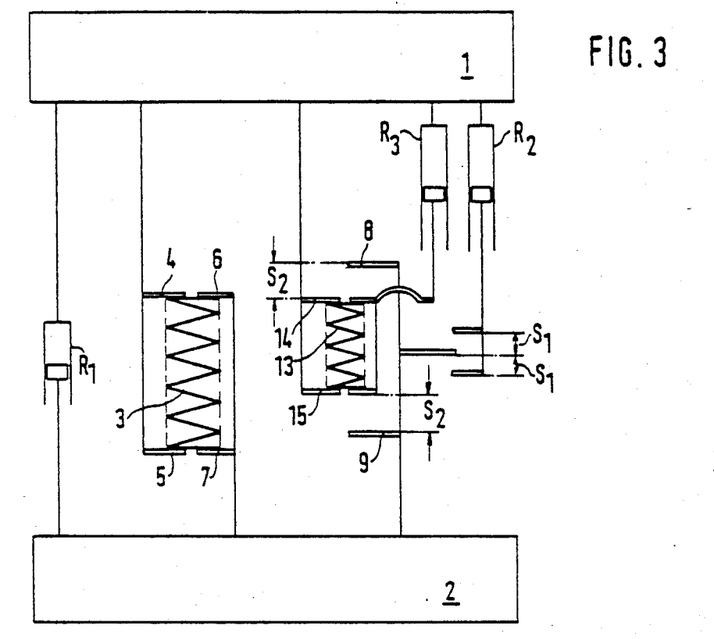

In FIGS. 1 to 3, two flywheel parts 1 and 2 are illustrated diagrammatically as heavy elements which are mutually braced and coupled by means of a coupling spring means 3, which cooperates with abutments 4 and 5 on flywheel part 1 and with abutments 6 and 7 on flywheel part 2. When flywheel parts 1 and 2 move relatively toward each other in one direction—as viewed in FIGS. 1 to 3—abutment 4 on flywheel part 1 moves closer to abutment 7 on flywheel part 2, i.e., the coupling spring means 3 becomes increasingly shortened and tensioned.

Unavoidable friction also occurs during relative movements between flywheel parts 1 and 2. This can optionally be amplified by design measures, such as friction linings and the like, and is represented in FIGS. 1 to 3 by a diagrammatically indicated telescopic attenuator $R_1$.

A stop arrangement which includes stops 8 and 9 is arranged on flywheel part 2. Stops 8 and 9 serve to limit the mobility of a connecting part 10 relative to flywheel part 2, in that elongations 11 and 12 attached to connecting part 10 contact one of the stops 8 and 9 when the connecting part moves out of the central position illustrated in FIG. 1 through a stroke $S_1$ towards stop 8, or by a corresponding stroke $S_1$ towards stop 9. Connecting part 10 is coupled non-positively to flywheel part 1, as is illustrated diagrammatically by a telescopic attenuator $R_2$. The resistance of the non-positive connection, and therefore of the attenuator $R_2$, between coupling part 10 and flywheel part 1, is substantially greater than the attenuation resistance produced directly between flywheel parts 1 and 2, as represented by attenuator $R_1$.

A stop spring means 13 is further arranged on flywheel part 1 with pretension between abutments 14 and 15 on flywheel part 1. The arrangement here is such that stop spring means 13 can cooperate with stops 8 and 9 when flywheel parts 1 and 2 are mutually displaced by a stroke $S_2$ in one or the other direction. For example, if flywheel part 1 is displaced sufficiently far towards stop 9, then stop spring means 13 becomes compressed between abutment 14 and stop 9, elongation 12 simultaneously becoming clamped between stop 9 and the adjacent end of stop spring means 13.

The flywheel illustrated in FIG. 1 operates in the following manner:

During normal operating cycles, a so-called supercritical operation exists, i.e., the engine-side flywheel part 1, for example, vibrates with a comparatively low amplitude and at a frequency which lies substantially above the resonant frequency of the vibrating system formed by flywheel parts 1 and 2 and coupling spring means 3. Only a trivial fraction of the vibrations of flywheel part 1 are transmitted to flywheel part 2, because coupling spring means 3 is incapable of transmitting any rapidly changing forces between flywheel parts 1 and 2.

When starting the engine, however, the critical range is passed through, i.e., engine-side flywheel part 1 is caused to vibrate by the engine at a frequency which corresponds to or approximates the resonant frequency of the vibrating system formed by flywheel parts 1 and 2 and coupling spring means 3. In this case, in the absence of special design measures, flywheel part 2 will be excited to vibrations of extraordinarily great amplitude, so that material fractures will be more likely to occur. However, this can be prevented in the manner described below.

When flywheel parts 1 and 2 are relatively displaced toward each other by more than a stroke $S_1$ (i.e., a distance ($S_1$) which is available in each direction of the relative movement and which is greater than the displacements which occur between flywheel parts 1 and 2 in the supercritical range), one of the elongations 11 or 12 of connecting part 10 contacts one of the stops 8 or 9, so that upon a further relative movement of flywheel parts 1 and 2, attenuator $R_2$ is compressed or extended by overcoming the attenuation resistance. An increased attenuation resistance, which corresponds to the sum of the attenuation resistances of attenuators $R_1$ and $R_2$, is therefore effective during the subsequent further displacement of flywheel parts 1 and 2. In the case of an even further relative displacement of flywheel parts 1 and 2, one of the ends of stop spring means 13 comes into contact with whichever one of the stops 8 or 9 is in contact with one of the elongations 11 and 12 of connecting part 10. Stop spring means 13 is therefore then effective in addition to the coupling spring means 3, to substantially increase the spring forces, together with the attenuation resistances of the attenuators $R_1$ and $R_2$, between flywheel parts 1 and 2. These increased spring forces are sufficient to stop this mutual displacement of flywheel parts 1 and 2, and to reverse the direction of the relative movement of the parts. It is particularly noteworthy that the attenuator $R_2$ initially remains effective both before and after the point of reversal of the movement. As long as stop spring means 13 is pressed against one of the stops 8 and 9, one of the elongations 11 and 12 of connecting part 10 is clamped between stop spring means 13 and one of the stops 8 and 9, so that the relative movements between flywheel parts 1 and 2 can occur only by compressing or extending attenuator $R_2$.

Figure 4:
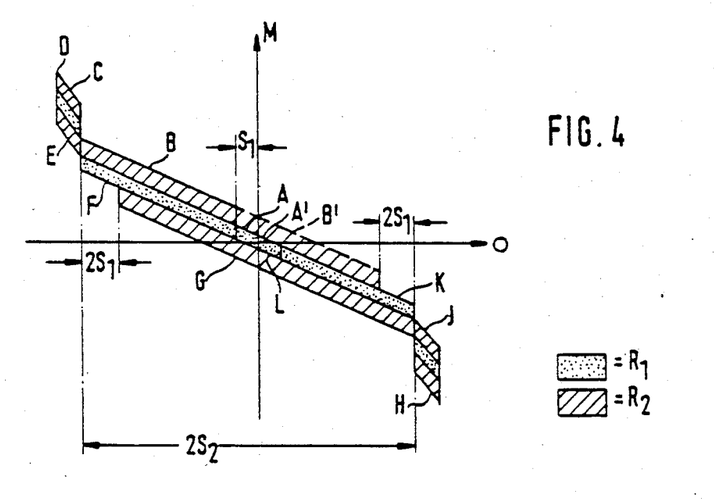
FIGS. 4 to 6 show graphs which explain the dependence of the torques (M) acting or to be overcome between the flywheel parts as a function of the mutual relative displacement (O) of the flywheel parts.

The operational behavior of the flywheel depicted in FIG. 1 is illustrated graphically in FIG. 4. If flywheel part 1 in FIG. 1 is displaced downwards relative to flywheel part 2, then the stroke section A in FIG. 4 is traversed. During this motion, coupling spring means 3 offers an increasing resistance, i.e., an increasing torque M, as displacement O increases. The resistance of attenuator $R_1$ also must be overcome. Therefore, stroke section A does not pass through the zero point at the intersection of the coordinates.

As soon as the displacement attains the value $S_1$, elongation 12 makes contact with stop 9, so that the resistance of attenuator $R_2$ comes into play, i.e., during further displacement the stroke section B is traversed. If flywheel part 1 in FIG. 1 is displaced still further toward part 2, then the lower end of stop spring means 13 comes into contact witn elongation 12 and stop 9, so that the pretensioned stop spring means 13 becomes effective. Consequently, stroke C in FIG. 4 is traversed along a steeper slope than stroke B, because coupling spring means 3 and stop spring means 13 are now cooperating. The jump between the stroke B and stroke C is caused by the pretensioning of stop spring means 13.

At end point D of stroke C, attenuators $R_1$ and $R_2$, together with coupling spring 3 and stop spring means 13, have brougnt the relative movement of flywheel parts 1 and 2 to a standstill. At this point, coupling spring means 3, compressed between abutments 4 and 7, and stop spring means 13, compressed between abutment 14 and stop 9, tend to return flywheel part 1 upwards as viewed in FIG. 1, relative to flywheel part 2. First, stroke E in FIG. 4 is traversed. Stroke E extends parallel to stroke C, but at a distance below stroke C because spring means 3 and 13 have to overcome the resistances of attenuators $R_1$ and $R_2$. As soon as flywheel part 1 in FIG. 1 has been displaced sufficiently upwards relative to flywheel part 2 for stop spring means 13 to no longer be pressed against stop 9, elongation 11 of connecting part 10 moves free of stop 9, so that flywheel part 1 can be moved relative to flywheel part 2 by a stroke $2S_1$ without attenuator $R_2$ being effective. This is represented by stroke F in FIG. 4. Subsequently, elongation 12 of connecting part 10 strikes against stop 9, so that attenuator $R_2$ becomes effective again, corresponding to stroke G in FIG. 4.

In the case of a further displacement, stop spring means 13 strikes against stop 8, clamping elongation 12 of the connecting part, so that stroke H in FIG. 4 is traversed. Then, as soon as a reversal of movement occurs again, strokes J, K and B' in FIG. 4 are traversed. Stroke B is therefore attained again with a correspondingly great return.

The stroke sequence A to B' illustrated in FIG. 4 is traversed only in very extreme cases. Relatively slight displacements occur even in the critical range, for example, when an engine is being started without delay due to cold and the like. The stroke sequence B, F, G, K and B' is possible in such a case, for example. In the supercritical range, only extremely slight displacements occur, so that a stroke sequence A, L and A', for example, is traversed in the graph of FIG. 4.

It is therefore emphasized that, in the case of an arrangement according to FIG. 1, attenuator $R_2$ becomes effective only when flywheel parts 1 and 2 are mutually displaced by more than a stroke distance $S_1$, whereas stop spring means 13 becomes effective only after a displacement by a stroke distance $S_2$.

Whereas the slopes of the stroke sections in FIG. 4 are dictated by the forces of coupling spring means 3 and of stop spring means 13, the transverse interval of parallel stroke sections results from the intensity of attenuators $R_1$ and $R_2$. The relative resistances of these attenuators are illustrated by different hatching patterns in the figures.

The exemplary embodiment according to FIG. 2 differs from that shown in FIG. 1 in that an additional connecting part 16 is provided. This part has elongations 17 and 18 which have the same spacing as abutments 14 and 15 of the stop spring means. Therefore, attenuator $R_3$, which represents the non-positive coupling between connecting part 16 and flywheel part 1, can become effective only when, in the case of a corresponding relative displacement of flywheel parts 1 and 2, one of elongations 17 or 18 is pressed against one of stops 8 or 9, and therefore clamped by stop spring means 13.

Figure 5:
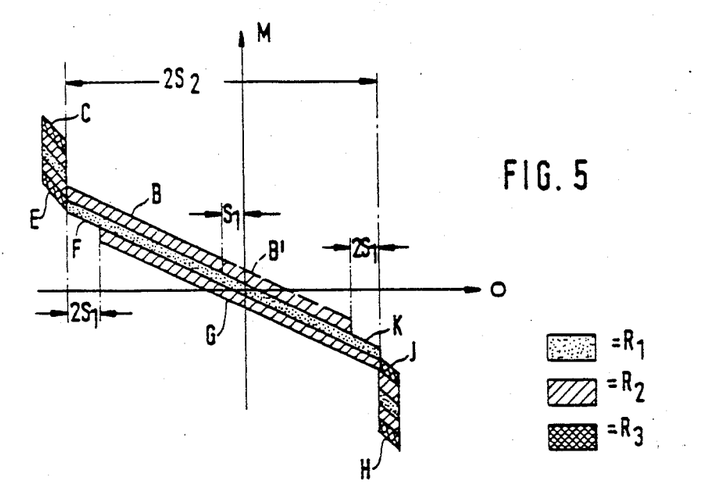

As FIG. 5 shows, the principle of operation of the arrangement shown in FIG. 2 is similar to that of the arrangement shown in FIG. 1. However, an intensified attenuation becomes effective when flywheel parts 1 and 2 are mutually displaced out of the central position illustrated in FIG. 2 by more than a stroke $S_2$. The intensified attenuation is attributable to the fact that all of the attenuators $R_1$ to $R_3$ cooperate in the case of a correspondingly great displacement.

The embodiment shown in FIG. 3 differs from that shown in FIG. 2 in that, instead of the arrangement involving connecting part 10, flywheel parts 1 and 2 are directly coupled by a non-positive connection symbolized by attenuator $R_2$, but in such a way that the non-positive connection—which occurs, for example, by frictional engagement—becomes effective only when flywheel parts 1 and 2 are displaced out of the illustrated central position by more than a stroke $S_1$ in one or the other direction. The non-positive connection therefore has, in total, a play of $2S_1$. As is clear from FIG. 6, in this arrangement attenuator $R_2$ takes effect, in the case of a major mutual relative displacement of flywheel parts 1 and 2, before the time of reversal of the direction of movement is reached.

Figure 7:
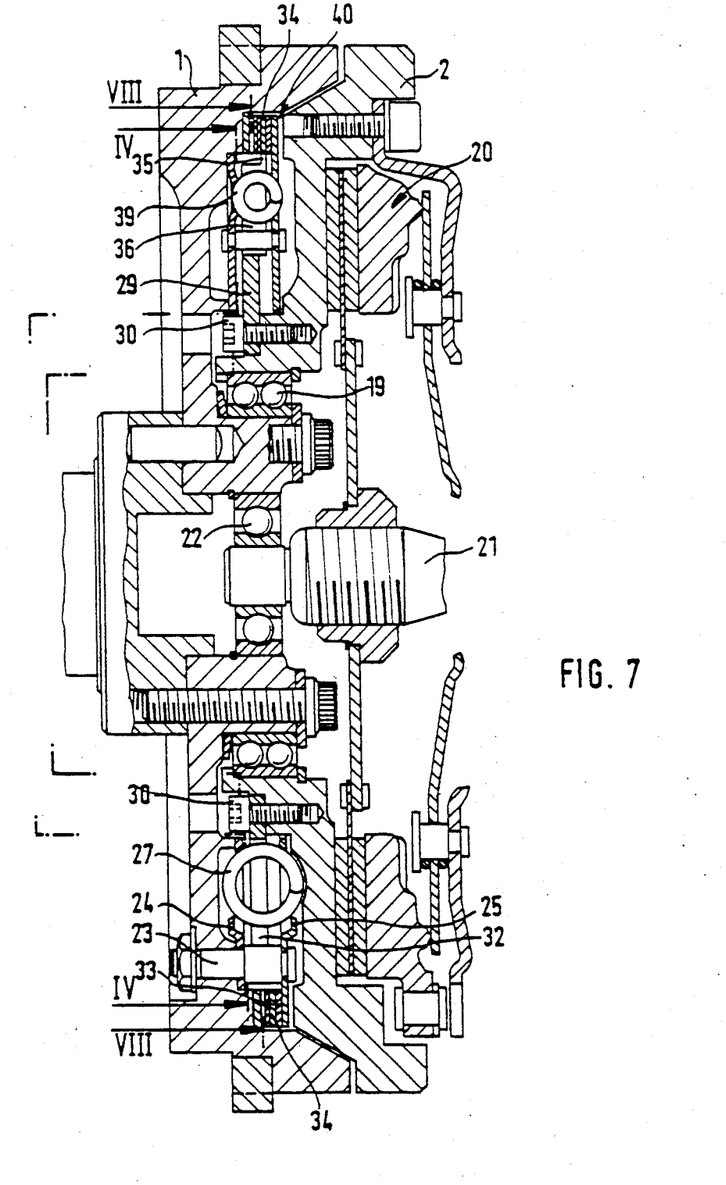
FIG. 7 shows a section in an axial plane of the flywheel.

In FIG. 7, flywheel part 1 is connected drivingly to the engine, which is not shown. Flywheel part 2 is mounted rotatably on flywheel part 1 by means of a bearing arrangement 19, and can be connected drivingly, by means of a coupling 20 which is illustrated diagrammatically, to input shaft 21 of a transmission line or a vehicle gearbox or the like, not otherwise shown. Another bearing 22 is arranged on the end of input shaft 21, so that flywheel part 1 and input shaft 21 are connected to each other without a direct driving connection.

Two annular discs 24 and 25 are fastened to flywheel part 1 at a set spacing by means of screw bolts 23. These annular discs 24 and 25 have a plurality of openings 26, which are symmetrically arranged tangentially to the disc axis. These openings 26 serve as cage-like guides for helicoidal springs 27, the diameter of which is greater than the spacing of the annular discs and the dimensions of openings 26, as measured radially from the center of the discs. Helicoidal springs 27 are inserted with pretension into openings 26, i.e., the end faces of springs 27 are pressed against the adjacent edges of openings 26.

Another annular disc 29, which is arranged between annular discs 24 and 25, is attached to flywheel part 2 by means of screw bolts 30. Annular disc 29 has radial recesses 31 which are open towards the outer circumferential side, the dimensions of which in the circumferential direction correspond approximately to the corresponding dimension of openings 26, so that radial elongations 32 are formed between the individual recesses 31. When flywheel parts 1 and 2 are rotated, annular discs 24 and 25 on the one hand, and annular disc 29 on the other hand, are rotated in the same way. However, with reference to FIG. 8, annular disc 29 is displaced in the direction of arrow X, for example, relative to annular disc 25 upon rotation of the assembly. The radial edges of elongations 32 which face in the direction of arrow X press against helicoidal springs 27, which accordingly are compressed between these edges and the edges of openings 26 which abut the opposite ends of each of the helicoidal springs. The same applies to the respectively opposite radial edges of elongations 32 and of openings 26 when annular disc 29, or flywheel part 2 attached integrally in rotation to it, is displaced in the opposite direction relative to flywheel part 1 and annular discs 24 and 25.

Helicoidal springs 27 therefore form coupling spring means 3 referred to above in the description of FIGS. 1 to 3.

An annular part 34 is retained non-positively by frictional engagement, but with mobility relative to flywheel part 1, between friction linings 33 which are pressed between flywheel part 1 and the outer marginal region of annular disc 25. This annular part 34 protrudes between annular discs 24 and 25 with tab-like elongations 35 pointing radially inwards. Tab parts 36, angled in the axial direction of the flywheel, are formed on each of the tab-like elongations 35 and protrude into recesses 37 in annular disc 29 open toward the circumferential side. In the central position illustrated in FIG. 8, tab parts 36 each have a spacing $S_1$ from the adjacent edges of recesses 37. When annular disc 29 is rotatably displaced relative to annular part 34, the tab parts 36 strike against the adjacent edges of recesses 37.

Figure 8:
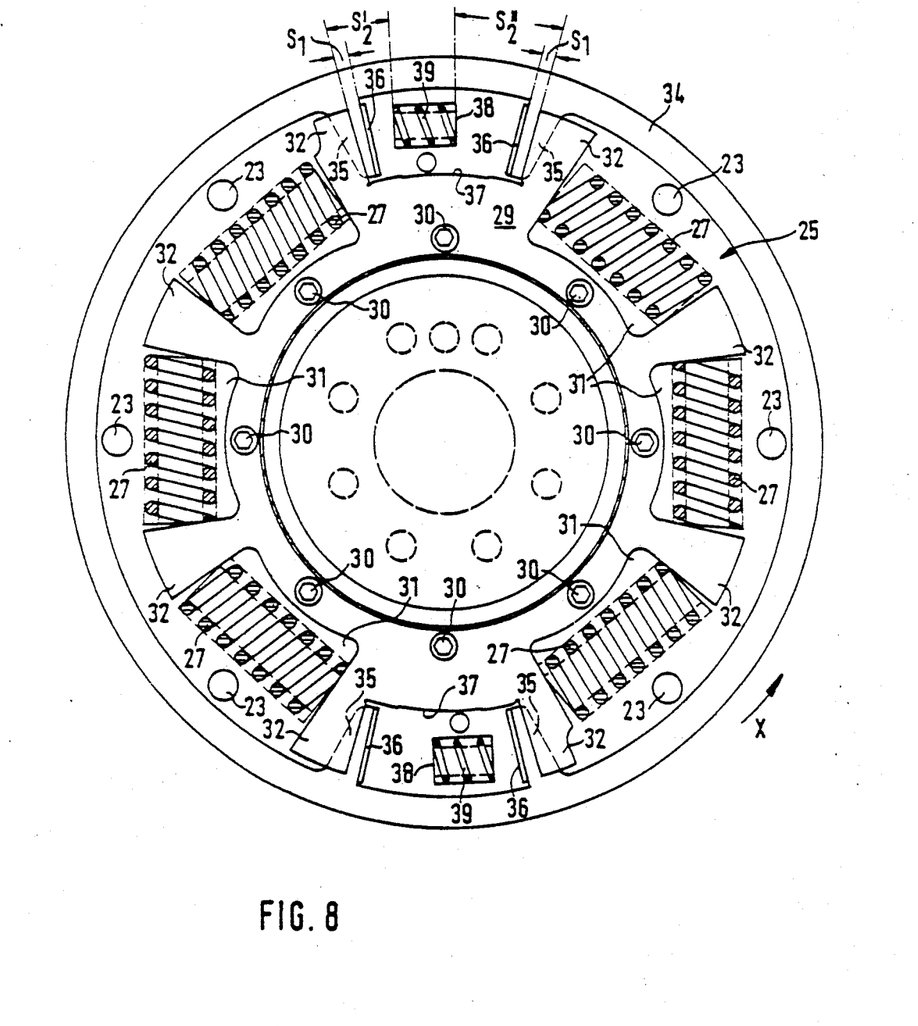
FIGS. 8 and 9 show sections corresponding to the radial planes VIII—VIII and IV—IV in FIG. 7.

Additional openings 38, which are formed in annular discs 24 and 25 in the vicinity of recesses 37, serve to accommodate and guide stop springs 39 which are arranged, in principle, in the same manner as helicoidal springs 27. Stop springs 39 are pretensioned, so that the spring ends press against the adjacent edges of openings 38.

Figure 9:
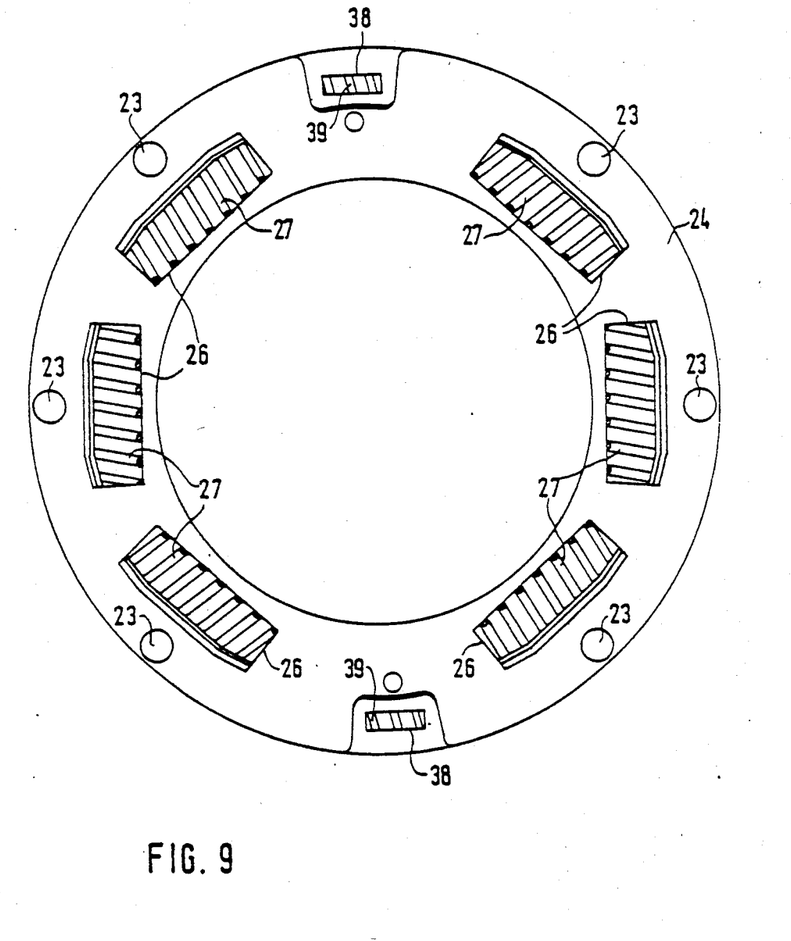

In the embodiment according to FIGS. 8 and 9, openings 38 are arranged somewhat eccentrically in the circumferential direction between the adjacent openings 26, so that the end faces of stop springs 39 are spaced a distance $S'_2$ in one direction, and $S''_2$ in the other direction, relative to the adjacent edges of recesses 37. An overall spacing of $2S_2$ is present, $S_2$ being a mean value of the spacing available in each direction.

Stop springs 39 correspond functionally to stop spring means 13 in FIG. 1, whereas the mutually facing edges of recesses 37 correspond to stops 8 and 9 in FIG. 1. Tab parts 36 (see FIG. 8) correspond to elongations 11 and 12 (see FIG. 1) of connecting part 10 which corresponds to annular part 34 in FIGS. 7 to 9. Attenuator $R_2$, illustrated diagrammatically in FIG. 1, is embodied by the frictional coupling which is effected between annular part 34 and flywheel part 1, or annular disc 25 attached integrally in rotation thereto, by means of friction linings 33.

Therefore, in the event of a displacement of flywheel parts 1 and 2 of the flywheel illustrated in FIGS. 7 to 9, at first only helicoidal springs 27 become increasingly compressed, because the radial elongations 32 of annular disc 29 move relative to openings 26. In the event of a more pronounced relative displacement of flywheel parts 1 and 2, one of the tab parts 36 strikes against the respectively adjacent edge of the associated recess 37. In the event of a still more pronounced displacement of flywheel parts 1 and 2, the resistance of the frictional coupling between annular part 34 and flywheel part 1 must be overcome, because annular part 34 cannot move further relative to flywheel part 2 and is therefore unable to follow the movement of flywheel part 1. This state exists when flywheel parts 1 and 2 are mutually displaced by more than the distance $S_1$.

As soon as the relative displacement of flywheel parts 1 and 2 exceeds the value $S'_2$ or $S''_2$, the respective end faces of stop springs 39 are pressed against the facing edges of recesses 37, so that in the event of a still more pronounced displacement of flywheel parts 1 and 2, stop springs 39 become increasingly compressed. Simultaneously with this, tab parts 36 become clamped at each recess 37 between stop springs 39 and the facing edge of the respective recess 37. This means that annular part 34 can not move relative to flywheel part 2, even if the mutual relative displacement of flywheel parts 1 and 2 which occurred previously comes to a standstill and then reverses due to the action of helicoidal springs 27 and stop springs 39.

The flywheel illustrated in FIGS. 7 to 9 therefore corresponds in its function to that illustrated in FIG. 1.

In order to modify the flywheel illustrated in FIGS. 7 to 9 to correspond to the arrangement of FIG. 2, it is necessary to provide another annular part, corresponding to annular part 34, between friction linings 33, in which case however the elongations arranged on this annular part, which are comparable to elongations 35 of annular part 34, are spaced at intervals which correspond to the extension of openings 38 in the circumferential direction.

Such an annular part therefore corresponds to connecting part 16 in FIG. 2, whereas attenuator $R_3$ illustrated there would be embodied by the frictional connection of this annular part to flywheel part 1.

It is possible to arrange additional friction linings between annular disc 25 and flywheel part 2—at 40 in FIG. 7, for example—to effect a direct coupling by frictional engagement between flywheel parts 1 and 2. When the linings arranged at 40 are relatively displaced in the circumferential direction, they embody the attenuation in the interval $2S_1$, which is effected by attenuator $R_2$ in FIG. 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Apparatus for reducing the transmission of vibrations from an engine to a transmission line comprising:
    a divided flywheel having an input part connected to an output of the engine and a coaxial output part connected to the input of the transmission line;
    coupling spring means, disposed between said input and output parts, for rotatably coupling said parts and for allowing the output part to rotate relative to the input part, said coupling spring means comprising a plurality of helicoidal springs arranged tangentially to a flywheel axis in openings formed in two annular discs which are rigidly attached to one of said input and output parts, and an annular member rigidly attached to the other of said parts, said annular member having radial elongations extending between adjacent ones of the helicoidal springs;
    first connecting part means, frictionally connected to one of said input and output parts, for engaging the other of said parts following relative displacement of said parts by a first predetermined angular displacement, said connecting part means comprising an annular part frictionally coupled to said one of said input and output parts, and having circumferentially spaced elongations extending into recesses formed in said annular member of said coupling spring means, and wherein a subset of said circumferentially spaced elongations engage respective edges of said recesses following relative displacement of said parts by said first predetermined angular displacement; and
    stop spring means, arranged on one of said input and output parts, for engaging a stop on the other of said parts following relative displacement of said parts by a second predetermined angular displacement, said stop spring means comprising helicoidal springs tangentially arranged in additional openings formed in the annular discs between said circumferentially spaced elongations and within said recesses; and
    wherein said subset of elongations are clamped between the stop spring means and said respective edges of said recesses when said parts are relatively displaced in excess of said second predetermined relative displacement.

2. Apparatus according to claim 1, wherein said helicoidal stop springs are arranged asymmetrically relative to the center of the corresponding recesses in said annular part so that the stop is engaged following a larger relative displacement of said parts in one direction than in the opposite direction.

3. Apparatus according to claim 1, wherein said first predetermined displacement is smaller than said second predetermined displacement.

4. Apparatus according to claim 1, wherein said first predetermined displacement is equal to said second predetermined displacement.

5. Apparatus according to claim 1, further comprising second connecting part means, arranged on said part with the first connecting part means, for engaging the other of said parts following a relative displacement of said parts, wherein said first connecting part means engages the other of said parts following a relative displacement of said parts which is less than said second predetermined angular displacement, and wherein said second connecting part means engages the other of said parts following a relative displacement of said parts which is approximately equal to said second predetermined angular displacement.

6. Apparatus according to claim 1, wherein the circumferential spacing between said elongations corresponds approximately to the circumferential dimension of the additional openings.

7. Apparatus according to claim 1, wherein the the circumferential spacing between said elongations is greater than the circumferential dimension of the additional openings.

8. Apparatus according to claim 1, further comprising first friction means rigidly attached to one of said input and output parts, and second friction means rigidly attached to the other of said parts, wherein said first and second friction means interact to provide frictional resistance to relative rotation of said parts following relative displacement of said parts by a predetermined angular displacement.

9. Apparatus for reducing the transmission of vibrations from an engine to a transmission line comprising:
    a divided flywheel having an input part connected to an output of the engine and a coaxial output part connected to the input of the transmission line;
    coupling spring means, disposed between said input and output parts, for rotatably coupling said parts and for allowing the output part to rotate relative to the input part;
    first connecting part means, frictionally connected to one of said input and output parts, for engaging the other of said parts following relative displacement of said parts by a first predetermined angular displacement;

stop spring means, arranged on one of said input and output parts, for engaging a stop on the other of said parts following relative displacement of said parts by a second predetermined angular displacement; and second connecting part means, arranged on said part with said first connecting part means, for engaging the other of said parts following a relative displacement of said parts, wherein said first connecting part means engages the other of said parts following a relative displacement of said parts which is less than said second predetermined angular displacement, and wherein said second connecting part means engages the other of said parts following a relative displacement of said parts which is approximately equal to said second predetermined angular displacement;

wherein a portion of said first connecting part means is clamped between the stop spring means and the stop when said parts are relatively displaced in excess of said second predetermined relative displacement.

* * * * *